US009166844B2

(12) United States Patent
Chen

(10) Patent No.: US 9,166,844 B2
(45) Date of Patent: Oct. 20, 2015

(54) RECEIVER WITH DUOBINARY MODE OF OPERATION

(71) Applicant: Rambus Inc., Sunnyvale, CA (US)

(72) Inventor: E-Hung Chen, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/073,003

(22) Filed: Nov. 6, 2013

(65) Prior Publication Data

US 2014/0140389 A1     May 22, 2014

Related U.S. Application Data

(60) Provisional application No. 61/727,587, filed on Nov. 16, 2012.

(51) Int. Cl.
*H04L 25/03*     (2006.01)
*H04L 25/49*     (2006.01)

(52) U.S. Cl.
CPC ...... *H04L 25/4917* (2013.01); *H04L 25/03146* (2013.01)

(58) Field of Classification Search
CPC ............ H04L 25/03057; H04L 25/497; H04L 2025/03617; H04L 2025/03503; H04L 25/03267; H04L 2025/0349; H04L 2025/03369; H04L 25/03146; H04L 25/4917
USPC ............ 375/233, 232, 230, 229, 316
See application file for complete search history.

(56) References Cited

U.S. PATENT DOCUMENTS

| | | | | |
|---|---|---|---|---|
| 3,665,394 A | * | 5/1972 | Lender et al. | 714/819 |
| 6,424,444 B1 | * | 7/2002 | Kahn et al. | 398/141 |
| 7,653,127 B2 | * | 1/2010 | Brunn et al. | 375/232 |
| 8,446,942 B2 | * | 5/2013 | Hasegawa et al. | 375/233 |
| 2005/0002475 A1 | * | 1/2005 | Menolfi et al. | 375/340 |
| 2005/0084020 A1 | * | 4/2005 | Kikuchi | 375/257 |
| 2009/0285277 A1 | * | 11/2009 | Sunaga et al. | 375/233 |
| 2010/0327924 A1 | * | 12/2010 | Hasegawa et al. | 327/155 |
| 2011/0018599 A1 | * | 1/2011 | Abbasfar | 327/158 |
| 2011/0299858 A1 | | 12/2011 | Mazzini et al. | |
| 2012/0068748 A1 | * | 3/2012 | Stojanovic et al. | 327/161 |
| 2013/0241622 A1 | * | 9/2013 | Zerbe et al. | 327/323 |

OTHER PUBLICATIONS

Lee et al., "A 20Gb/s Duobinary Transceiver in 90nm CMOS," IEEE International Solid-State Circuits Conference Feb. 3-7, 2008, Digest of Technical Papers pp. 102-103, 599. 3 pages.

(Continued)

*Primary Examiner* — Kenneth Lam
(74) *Attorney, Agent, or Firm* — Lance Kreisman; Peninsula Patent Group

(57) ABSTRACT

An integrated circuit is disclosed that includes a receiver circuit to receive duobinary data symbols from a first signaling lane. The receiver circuit includes sampling circuitry to determine symbol state, and a duobinary decoder. The duobinary decoder is coupled to the sampling circuitry and converts the detected states to a PAM2 coded symbol stream. A decision-feedback equalizer (DFE) is provided that has inputs coupled to the sampling circuitry in parallel with the duobinary decoder. The DFE cooperates with the sampling circuitry to form a feedback path, such that the duobinary decoder is external to the feedback path.

6 Claims, 5 Drawing Sheets

(56) References Cited

OTHER PUBLICATIONS

Lee et al., "Design and Comparison of Three 20-Gb/s Backplane Transceivers for Duobinary, PAM4, and NRZ Data," IEEE Journal of Solid-State Circuits, vol. 43, No. 9, Sep. 2008. 14 pages.

Mandich et al., "Electrical Duobinary Signaling for Backplane Transmission at 25Gbits/s and Beyond," published at www.eetimes.com on Apr. 11, 2005 at 9:00am EDT. 4 pages.

Park et al., "A 7Gb/s 9.3mW 2-Tap Current-Integrating DFE Receiver," IEEE International Solid-State Circuits Conference 2007, Feb. 11-15, 2007, Digest of Technical Papers, pp. 230-231, 599. 3 pages.

Rosenkranz et al., "Electrical Equalization for Advanced Optical Communication Systems," AEU—International Journal of Electronics and Communications, vol. 61, Issue 3, Mar. 2007, pp. 153-157. 4 pages.

Sinsky et al., "High-Speed Electrical Backplane Transmission Using Duobinary Signaling," IEEE Transactions on Microwave Theory and Techniques, vol. 53, No. 1, Jan. 2005. 9 pages.

Sunaga et al., "An 18Gb/s Duobinary Receiver With a CDR-Assisted DFE," IEEE International Solid-State Circuits Conference—Digest of Technical Papers, 2009, pp. 273-275 and Visual Supplement, Feb. 8-12, 2009. 32 pages.

Toifl et al., "A 3.1mW/Gbps 30Gbps Quarter-Rate Triple-Speculation 15-tap SC-DFE RX Data Path in 32nm CMOS," 2012 Symposium on VLSI Circuits (VLSIC), Jun. 13-15, 2012, pp. 102-103. 2 pages.

Yamguchi et al., "12-Gbit/s Duobinary Signaling With x2 Oversampled Edge Equalization," published at www.eetimes.com on Mar. 11, 2005 at 9:00am EDT. 3 pages.

\* cited by examiner

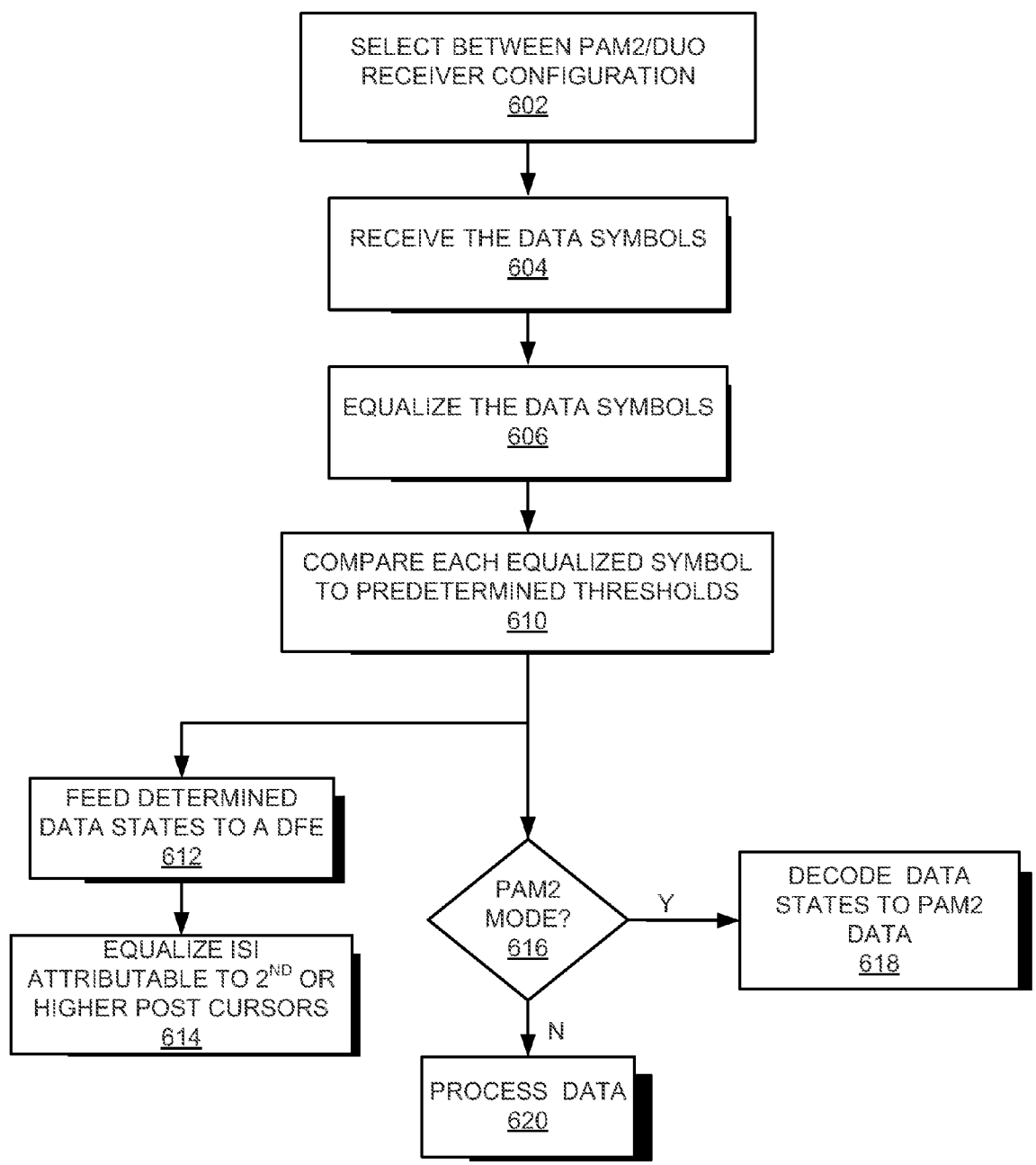

RECEIVER WITH DUOBINARY MODE OF OPERATION

CROSS-REFERENCE TO RELATED APPLICATIONS

This application claims the benefit of priority under 35 U.S.C. §119(e) to Provisional Application Ser. No. 61/727,587, filed Nov. 16, 2012, titled RECEIVER WITH DUOBINARY MODE OF OPERATION, which is incorporated herein by reference in its entirety.

TECHNICAL FIELD

The disclosure herein relates generally to communications, and more specifically to high speed electronic signaling within and between integrated circuit devices.

BACKGROUND

Duobinary coding is a signaling scheme often employed in optical networks due to its data rate capabilities with a reduced spectrum. Generally, the coding involves summing each current bit with the most recent previously transmitted bit, and providing three possible signal levels corresponding to three states. One of the interesting characteristics of duobinary signaling is that inter-symbol interference (ISI) is introduced in a controlled manner, where two adjacent bits are correlated to introduce the ISI.

For electrical networks that often employ decision-feedback equalizers (DFE) to address ISI, avoiding large $1^{st}$ post-cursor DFE subtraction is of interest. One reason is the amount of power consumed by each equalizer tap. However, conventional duobinary signaling techniques often introduce unacceptable delays into the DFE critical feedback path. Thus, the need exists for improved equalization techniques for duobinary signaling that provide improved effectiveness in reducing ISI while maintaining power and space efficiencies.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 6 illustrates a flowchart of high-level steps involved in operating the receiver integrated circuit of FIG. 5.

DETAILED DESCRIPTION

Embodiments of receiver integrated circuits are disclosed herein that provide improved effectiveness in mitigating intersymbol interference (ISI).

One embodiment of such a device includes a receiver circuit to receive duobinary data symbols from a first signaling lane. The receiver circuit includes sampling circuitry to determine symbol state, and a duobinary decoder. The duobinary decoder is coupled to the sampling circuitry and converts the detected states to a PAM2 coded symbol stream. A decision-feedback equalizer (DFE) is provided that has inputs coupled to the sampling circuitry in parallel with the duobinary decoder. The DFE cooperates with the sampling circuitry to form a feedback path, such that the duobinary decoder is external to the feedback path. In this way, the circuit may take advantage of the inherent post-cursor-mitigating characteristics of the duobinary encoded sequence without incurring delay in the critical feedback path of the DFE.

Optionally, the DFE takes the form of a partial response decision-feedback equalizer (PrDFE), which shares the sampling circuitry with the duobinary decoder.

Optionally also, a linear equalization circuit (sometimes called a continuous-time equalizer) can be employed to mitigate the effects of pre-cursor ISI, thus complementing the post-cursor mitigating capabilities of the DFE.

In further embodiments, an integrated circuit device is disclosed. The device includes a receiver circuit for receiving data symbols from a first signaling lane. The receiver circuit includes partial response circuitry and duobinary decoder circuitry. Comparator circuitry is shared by both the partial response circuitry and the duobinary decoder circuitry for respective partial response and duobinary modes of operation. The comparator circuitry is operable to detect a pair of data states based on predetermined thresholds. The partial response mode of operation utilizes the comparator circuitry with the partial response circuitry to provide the output data states as alternative data values—one of the values to be selected as a current data value based on a prior resolved data value. The duobinary mode of operation utilizes the comparator circuitry with the duobinary decoder circuitry, and is operable to evaluate the pair of data states and generate PAM2 data based on the combined data states.

These various embodiments will be additionally detailed below.

Figure 1:
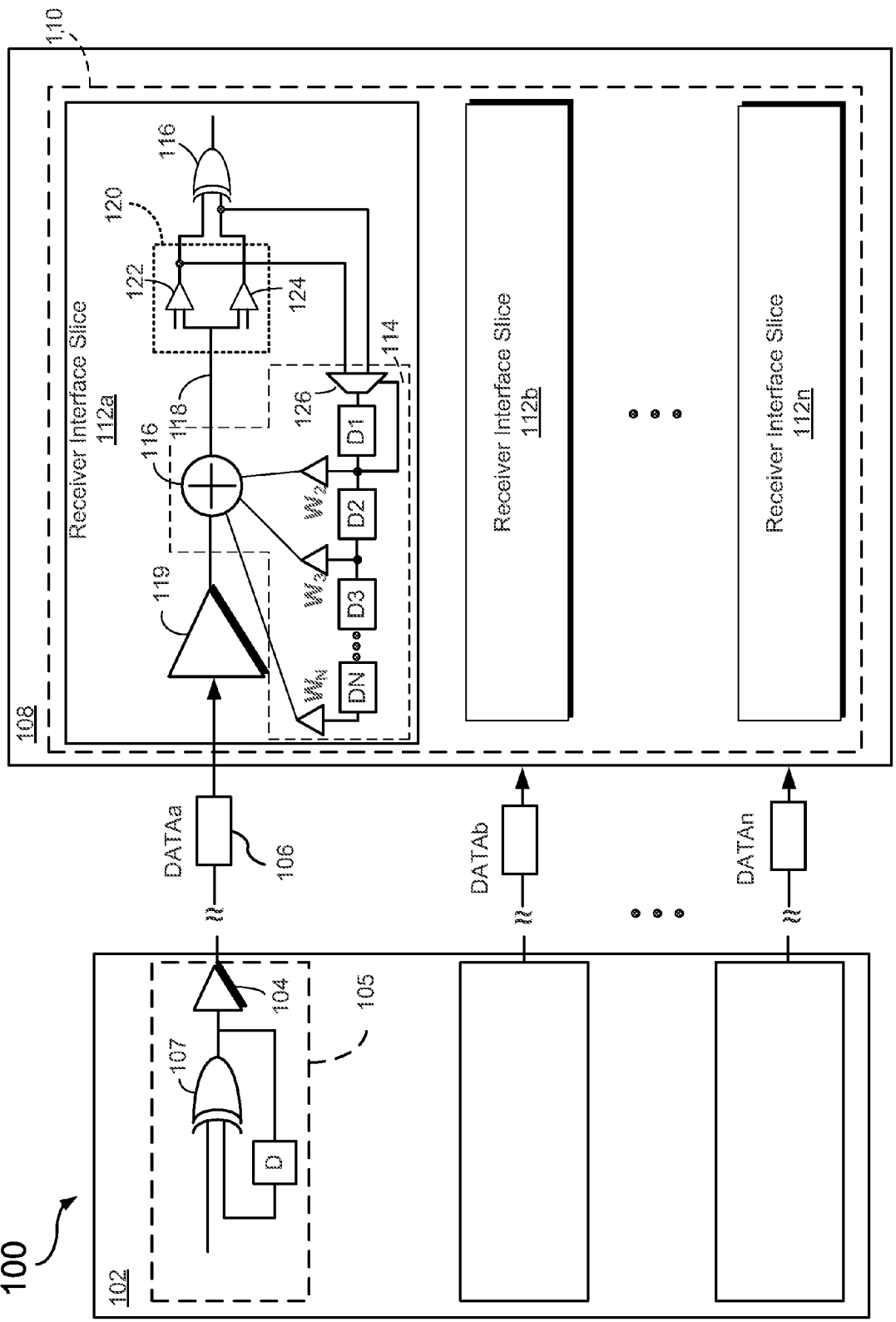
FIG. 1 illustrates one embodiment of a high-level duobinary signaling system having a receiver integrated circuit.

FIG. 1 illustrates one embodiment of a duobinary signaling system, generally designated 100, that effectively mitigates the effects of post-cursor ISI at a high level of efficiency. In some specific embodiments, compensation for pre-cursor ISI may also be provided. Although the disclosure below is directed primarily to duobinary signaling techniques, it is to be understood that minor enhancements may be made to extend the principles herein to polybinary signaling techniques in general.

Further referring to FIG. 1, the system 100 includes a first integrated circuit 102 having at least one transmitter 104 to drive data symbols DATAa along an electrical channel 106 to a second integrated circuit 108. In one embodiment, the data symbols are encoded into a duobinary sequence of bits where each transmitted bit is a summation of the current bit signal level and the previous bit signal level. A precoder circuit 105 carries out the encoding by feeding a PAM2 sequence of bits (such as NRZ coded data) into a first input "A" of an Exclusive-OR (XOR) gate 107. The output "O" of the XOR gate is fed back through a delay element D to a second input "B" of the XOR gate. The delay exhibited by the delay element D corresponds to one bit or unit interval (UI).

Figure 2:
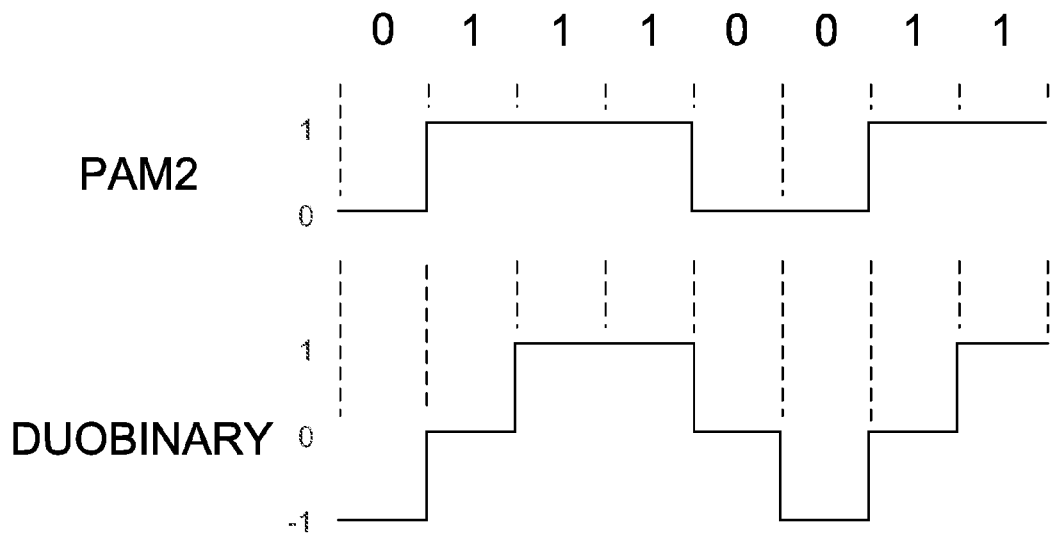
FIG. 2 illustrates a PAM2 signal level coding for a given sequence of bits, and a duobinary signal level coding for the same sequence of bits.

During transmission, the coded signal is transmitted through the electrical channel 106a which typically exhibits a low-pass filter effect resulting in attenuation of high-frequency signal components. With the aid of linear or non-linear equalization (such as DFE), the data input at 118 exhibit three distinct values (positive-level, zero-level, and negative-level), and the relationship between such three level duobinary and PAM2 NRZ sequence is illustrated in FIG. 2. Decoding the duobinary sequence merely involves XORing the duobinary sequence at the receiver end. Although the duobinary encoding introduces an inherent level of equalization in its coding scheme to mitigate significant $1^{st}$ post-cursor ISI, linear equalization may also be provided to address both post and pre-cursor ISI. For purposes of clarity, each symbol referred to herein represents a bit value, although in some embodiments a symbol may be represented by one or more bit values received during a bit interval.

Referring back to FIG. 1, the second integrated circuit 108 includes receiver circuitry 110 in the form of a plurality of receiver interface slices 112a-112n. Each slice may correspond to a single channel, or multiple channels aggregated to form a link of a defined width. Further, portions of the receiver circuitry described below may be dedicated to a particular channel or link, or shared between multiple channels or links. For purposes of brevity, only one receiver interface slice 112a will be described in detail below.

Further referring to FIG. 1, the receiver interface slice 112a employs a decision-feedback equalizer (DFE) circuit 114 that is coupled to a duobinary decoder 116 in such a manner that a critical feedback path of the DFE is not impacted by the decoding operations carried out by the decoder 116. The DFE circuit 114, in one embodiment, takes the form of a partial response decision-feedback equalizer (PrDFE). PrDFE provides a "loop-unrolled" manner of delivering feedback pertaining to a resolved bit for use in compensating for ISI effects on a subsequent input bit.

In one embodiment, the PrDFE 114 includes a summing node 116 that feeds a common data input at 118 to a sampling circuit or slicer 120. The sampling circuit employs two samplers 122 and 124, each having respective threshold inputs Vt+ and Vt− for comparison to a data symbol fed by the common data input 118. Each sampler output is fed to a respective input of a selector 126. The selector has a control input that is responsive to a previously received bit output from the selector 126. A cascaded line of delay elements D2-DN cooperates with corresponding tap weight circuits W2-WN to provide selectable equalization for each of a series of previously received bits. Each output from each tap weight circuit is fed to the summing node 116 to subtract (or add) a signal component to the received input to counter the effects of ISI from a particular previously received bit.

One of the important constraints often associated with a DFE is the timing involved in detecting an input data value, feeding the detected value to the equalizer tap weights, and applying the weighted equalization to the summing node 116 to cancel ISI from the next received symbol. Thus, the DFE critical feedback path is generally constrained to operate within the bit or unit interval UI. The DFE critical feedback path of FIG. 1 involves the summing node 116, the sampling circuitry 120, and the DFE circuit 114.

By realizing that the resulting feedback path, including the sampling circuitry 120, forms a portion of a partial response NRZ DFE path, where the $1^{st}$ post-cursor equals the main cursor, the duobinary decoder 116 may be placed outside of the DFE critical feedback path.

In addition to feeding the inputs to the selector 126, the sampler outputs are also fed to the duobinary-to-PAM2 decoder 116. The decoder decodes the received duobinary symbols into PAM2 symbols, such as in a non-return-to-zero (NRZ) format. Having the decoder 116 outside of the DFE critical feedback path avoids introducing delay into the DFE circuit 114. As a result, the DFE circuit 114 can more accurately handle ISI affecting the second and higher post-cursors, since the duobinary encoding inherently mitigates the effects of the $1^{st}$ post-cursor ISI.

In some embodiments, the receiver interface slice 112a may include a linear equalizer 119 to directly receive the transmitted symbols. Such equalizers may take the form of continuous time linear equalizers (CTLE), and may be employed to address undesirable pre-cursor and post-cursor ISI effects.

Additionally, although respective transmit and receive circuits are described above with respect to each integrated circuit 102 and 108, each IC may include transceiver circuitry that generally employs both a transmit circuit and a receiver circuit at each IC input/output pin for bidirectional communication along each link.

Figure 3:
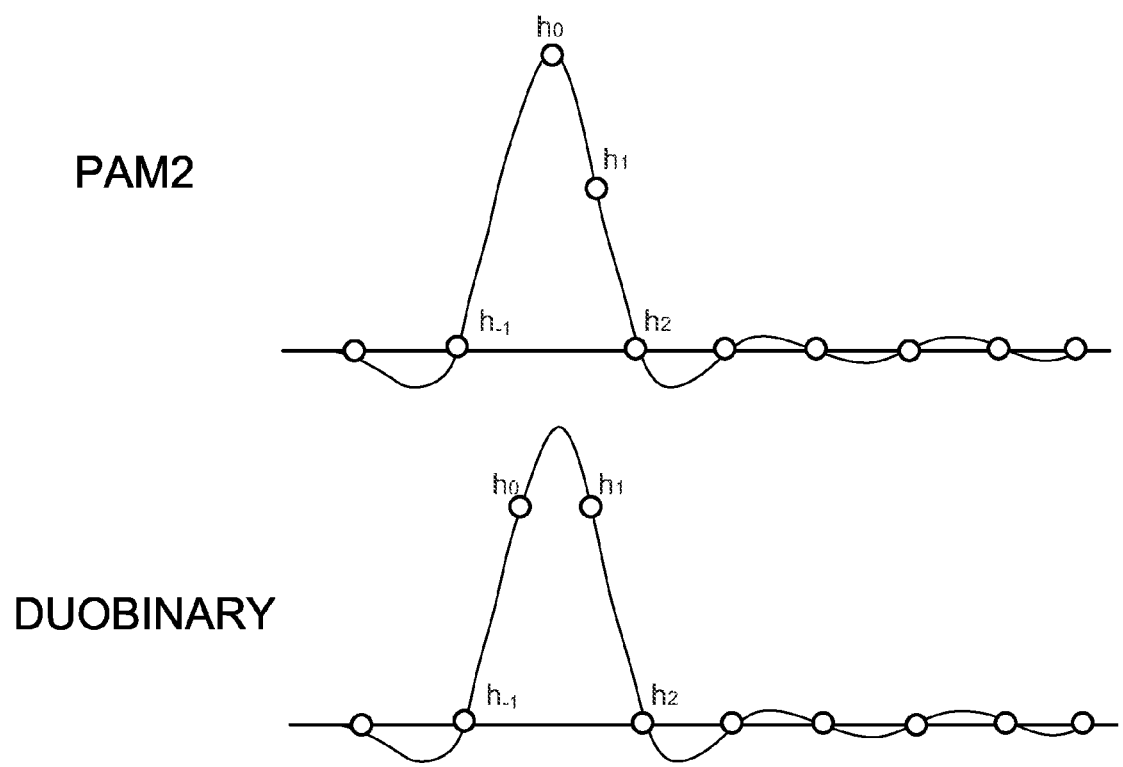
FIG. 3 graphically shows a plurality of overlayed single-bit-response waveforms corresponding to PAM2 coding and duobinary coding, respectively.

FIG. 3 illustrates a set of overlaid single bit response (SBR) curves that compare the channel response for a PAM2 sequence of bits and a duobinary sequence, with pre-cursors and post cursors also shown. With the PAM2 coding, the main cursor $h_0$ generally corresponds to the channel response peak, with the $1^{st}$ post cursor $h_1$ having a relatively large impact to the channel response. In contrast, the duobinary coding causes the channel response to exhibit a main cursor $h_0$ as approximately equal to the $1^{st}$ post-cursor $h_1$. As a result, the $1^{st}$ post-cursor can be easily subtracted out, without the use of DFE, merely with knowledge of the main cursor.

Figure 4:
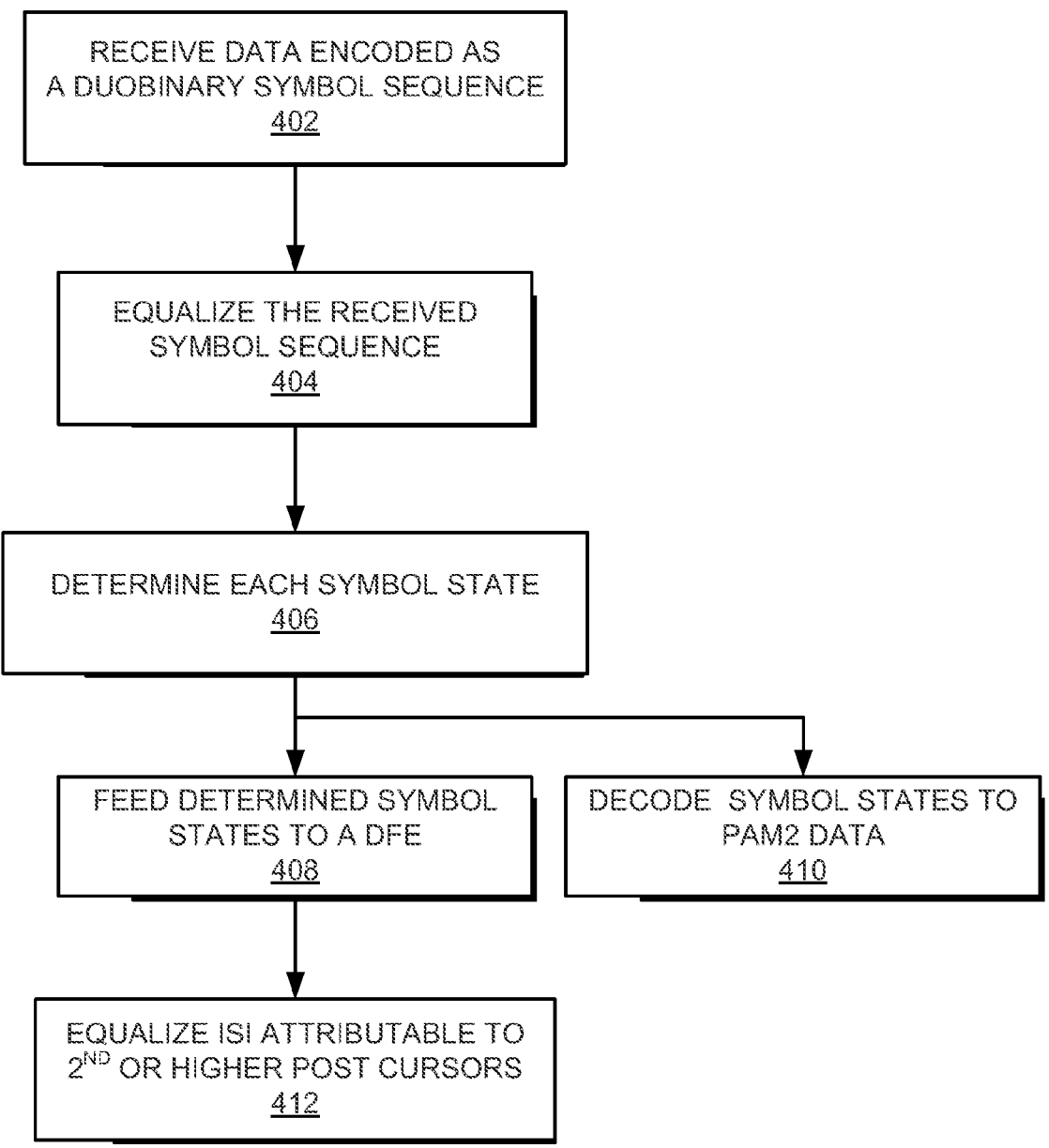
FIG. 4 illustrates a flowchart of high-level steps involved in operating the receiver integrated circuit of FIG. 1.

FIG. 4 illustrates one embodiment of a high-level flowchart of steps that correspond to the operation of the receiver interface slice 112a described above. Data encoded as a duobinary symbol sequence is first received at the receiver IC 108, at step 402. Optionally, the received sequence may first undergo linear equalization, at step 404, to mitigate pre-cursor and post-cursor ISI. The states of the symbols are then determined, at step 406, via the slicer or sampler circuitry 120. At this point, the receiver interface slice 112a has utilized circuitry common to what would be needed for either PrDFE or decoding operations separately. The determined states may be used for both decoding and DFE by merely tapping the detected states from the input of the decoder, and feeding the determined states to the DFE selector 126, at step 408. Concurrently, the states are decoded by the decoder 116 into PAM2 symbols, at 410. Subsequent data symbols are received at the summing node 116, where compensation from the PrDFE circuit 114 is provided in the form of equalization to address ISI attributable to $2^{nd}$ or higher post cursors, at step 412.

Those skilled in the art will appreciate that sharing the sampling circuitry with both a duobinary decoder and a PrDFE enables the decoder to be placed outside of the DFE critical feedback path. Avoiding the delay associated with the duobinary decoder enables implementation of duobinary coding along a high-speed electrical signaling link. Further, error propagation may be reduced by implementing the duobinary coding architecture, circuits and methods described herein.

The duobinary signaling architecture, circuits and method steps described above are generally directed to a signaling system that supports duobinary, or polybinary coded symbol transfers along an electrical signaling channel. For some applications, having the flexibility to communicate in multiple selectable modes, such as, for example, a polybinary mode and a PAM2 mode would be beneficial. Such a system is described below.

Figure 5:
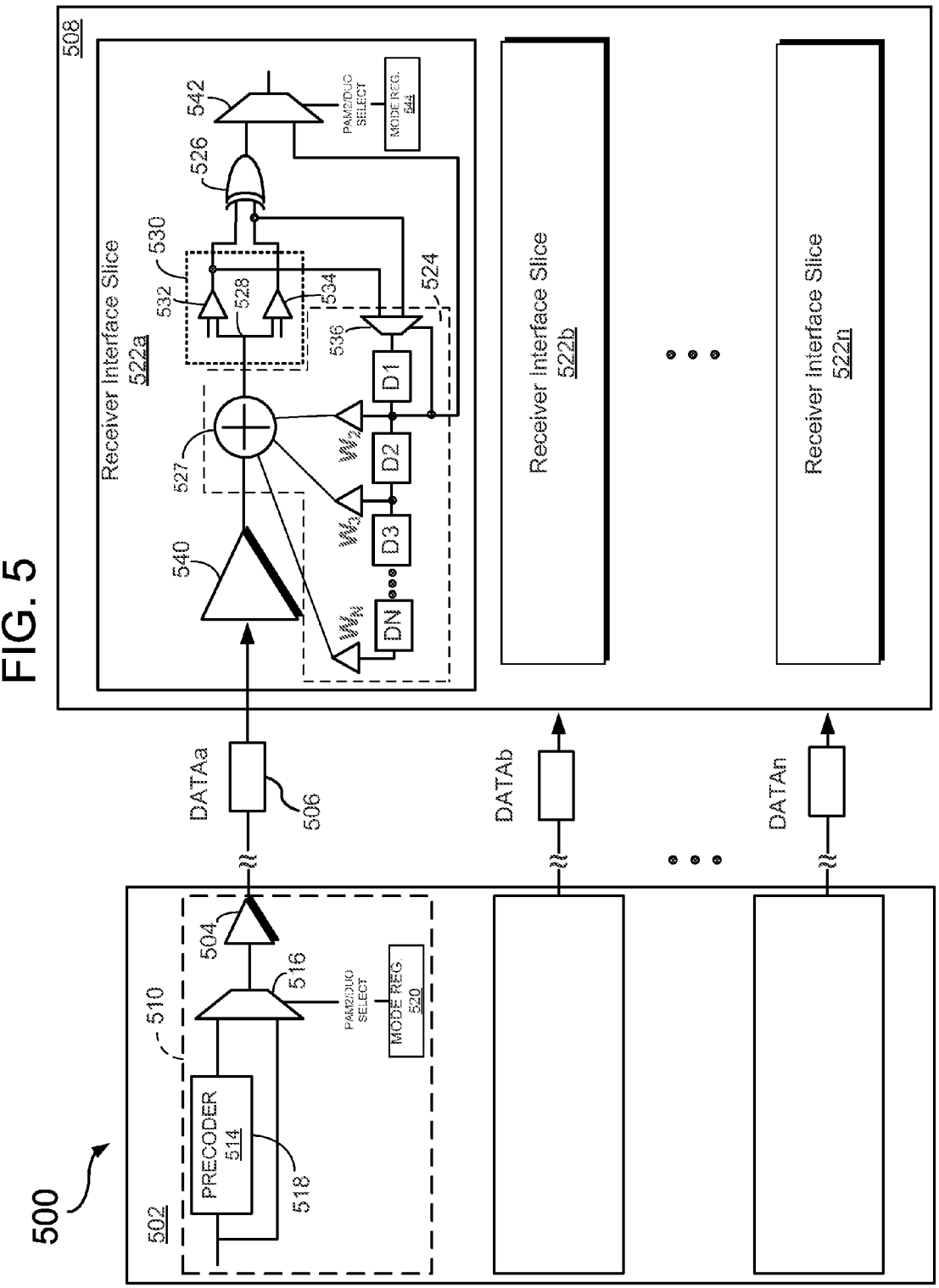
FIG. 5 illustrates a high-level signaling system similar to FIG. 1, but including circuitry to allow multiple modes of operation for each lane.

FIG. 5 illustrates a signaling system, generally designated 500, that supports multiple signaling modes, such as duobinary coded symbols and PAM2 coded symbols. The system 500 includes a first integrated circuit 502 having at least one transmitter 504 to drive data symbols DATAa along an electrical channel 506 to a second integrated circuit 508. Depending on the mode of signal transmission and reception, the data symbols may be encoded into a duobinary sequence of bits, or PAM2 data, such as an NRZ sequence of bits.

Assuming that the data is originally encoded in an NRZ format, it is presented to the input of a coding selection circuit 510. The coding selection circuit 510 includes a first path dedicated to encoding the NRZ data symbols into duobinary symbols. This may be straightforwardly handled through use of a precoder 514 similar to the precoder circuit 105 described above with respect to FIG. 1. The output of the precoder 514 feeds one input of a selector 516. A second path 518 bypasses the precoder 514 to directly provide the NRZ coded symbols to a second input of the selector 516. A programmable mode register 520 provides a mode control signal to a control input of the selector 516 to select the appropriate symbol stream for transmission. The mode signal may be externally programmed, or determined through a link training or auto-negotiation sequence such that both integrated circuits 502 and 508 operate in accordance with the same mode.

Further referring to FIG. 5, the second integrated circuit 508 includes plural receiver interface slices 522a-522n which may include multiple copies of the same circuitry, but for separate channels. For purposes of brevity, only one receiver interface slice 522a will be described in detail, with the understanding that the additional receiver interface slices are similarly formed. The receiver interface slice 522a includes employs a decision-feedback equalizer (DFE) circuit 524 that is coupled to a duobinary decoder 526 in such a manner that a critical feedback path of the DFE is not impacted by the decoding. The DFE circuit 524, in one embodiment, takes the form of a partial response decision-feedback equalizer (PrDFE) similar to that described in relation to FIG. 1.

In one embodiment, the PrDFE 524 includes a summing node 527 that feeds a common data input at 528 to a sampling circuit or slicer 530. The sampling circuit employs two samplers 532 and 534, each having respective threshold inputs Vt+ and Vt− for comparison to a data symbol fed by the common data input. Each sampler output is fed to a respective input of a selector 536. The selector has a control input that is responsive to a previously received bit output from the selector. A cascaded line of delay elements D2-DN cooperates with corresponding tap weight circuits W2-WN to provide selectable equalization for each of a series of previously received bits. Each output from the tap weights is fed to the summing node 527 to subtract (or add) a signal component to the received input to counter the effects of ISI from a particular previously received bit.

In addition to feeding the inputs to the selector 536, the sampler outputs are also fed to the duobinary-to-PAM2 decoder 526. The decoder decodes the received duobinary symbols into PAM2 symbols, such as in a non-return-to-zero (NRZ) format. As explained with respect to FIG. 1, having the decoder outside of the DFE feedback path avoids introducing delay into the DFE circuit 524. As a result, the DFE circuit 524 can more accurately handle ISI affecting the second and higher post-cursors, since the duobinary encoding inherently mitigates the effects of the $1^{st}$ post-cursor ISI with a simple subtraction of the main cursor value to handle the $1^{st}$ post-cursor.

Similar to the architecture of FIG. 1, in some embodiments, the receiver interface slice 522a may include a linear equalizer 540 to directly receive the transmitted symbols. Such equalizers may take the form of continuous time linear equalizers (CTLE), and may be employed to address undesirable pre-cursor ISI effects.

To provide for selectable reception of duobinary or NRZ symbol streams, the receiver interface slice 522a includes an additional selector 542 that includes a first input to receive the output from the duobinary decoder 526, and a second input to receive selected non-decoded duobinary symbol from the output of the partial response selector 536. A second mode register 544 stores a programmable mode control value that is fed to a control input of the selector 542. The selector 542 is responsive to the mode control value to either pass the decoded NRZ symbols or the non-decoded duobinary symbols at its output.

FIG. 6 illustrates a high-level sequence of steps that correspond to a method of operation of the receiver circuit slice 522a. The method begins by establishing or selecting between a PAM2 or duobinary receiver configuration, at step 602. This typically depends on the application, such as whether burst errors are expected, or whether only legacy PAM2 modes are supported by the coupled link partner. As explained earlier, the mode is typically selected via external programming, or through a link handshake operation where the modes of the link partners are exchanged for compatibility.

Further referring to FIG. 6, once the link partners have been configured to transmit and receive signals in the appropriate signaling mode, the data symbols are transmitted from the transmit IC, and received by the receiver IC, at step 604. If pre-cursor ISI is to be mitigated, an optional linear equalization step may be carried out to equalize the received symbols, at 606. Each received symbol is then sampled by the pair of comparators to generate sampled values along alternative decision paths. The sampled values are the results of a comparison of the symbol value to the high and low thresholds, at step 610.

Once the sampled values are determined and provided on the alternative sample paths, they are fed along a DFE critical feedback path, at 612. The DFE generates compensation for $2^{nd}$ or higher post-cursors, with the compensation being summed with subsequent input symbols, at 614. A determination is then made as to whether the receiver is in a PAM2 mode or duobinary mode of operation, at 616. Concurrently with feeding the samples to the DFE, the sampled values are passed to the duobinary decoder for decoding to PAM2 data, at 618. If the receiver is configured in a duobinary mode, then the decoded PAM2 data from duobinary decoder is passed as the output from the output selector. If the receiver is configured in a PAM2 mode, then the duobinary decoder is bypassed, and the PAM2 data tapped from the output of the DFE selector is passed to the output of the output selector.

Those skilled in the art will appreciate the many benefits and advantages afforded by the embodiments described herein. For example, by reusing a sampling circuit for both duobinary decoding and DFE functions, duobinary signaling may benefit from DFE compensation without incurring added delay in the critical feedback path of the DFE. Further, by providing selectable modes for signaling in either duobinary or PAM2 coding formats, added flexibility for signaling schemes may be realized depending on the specific application at hand.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An integrated circuit (IC) comprising:
   a receiver including samplers to sample a signal and to generate a set of sampled signals;
   first logic to receive the set of sampled signals and operable to generate a binary output in dependence on simultaneous output of both samplers; and
   second logic to receive the set of sampled signals in parallel with the first logic and operable to generate a second binary output based on the output of one of the samplers only in dependence on feedback representing a prior symbol.

2. The IC of claim 1 where the signal conveys duobinary signaling and where the first logic is operable to generate a binary data output in dependence on the duobinary signaling.

3. The IC of claim 1 further comprising a Decision-Feedback Equalizer (DFE), the DFE coupled to receive the binary output of the second logic.

4. The IC of claim 1 where the second logic effectuates a partial response decision-feedback equalizer (PrDFE) and where the DFE provides an output used to equalize the signal for post-cursor ISI.

5. The IC of claim 1, wherein the receiver is a dual mode receiver operable in each of a duobinary mode and a 2-Pulse Amplitude Modulation (2-PAM) mode, the IC further comprising a circuit operable to select an alternative one of the binary output of the first logic or the second logic in dependence on operating mode as providing a data output of the receiver.

6. The IC of claim 1, further comprising a pin adapted to couple to an external signaling link, wherein the receiver is coupled to the pin to receive the signal therefrom.

* * * * *